(12) United States Patent
Thiele et al.

(10) Patent No.: US 7,282,895 B2
(45) Date of Patent: Oct. 16, 2007

(54) ACTIVE DROPOUT OPTIMIZATION FOR CURRENT MODE LDOS

(75) Inventors: Gerhard Thiele, Munich (DE); Erich Bayer, Thonhausen (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/199,326

(22) Filed: Aug. 8, 2005

(65) Prior Publication Data

US 2006/0033481 A1 Feb. 16, 2006

(30) Foreign Application Priority Data

Aug. 6, 2004 (DE) ............... 10 2004 038 597

(51) Int. Cl.
*G05F 1/00* (2006.01)
*G05F 1/613* (2006.01)

(52) U.S. Cl. ................. 323/266; 323/224

(58) Field of Classification Search ........... 323/266, 323/277, 273, 274, 275, 269, 270, 224; 363/51, 363/39

See application file for complete search history.

(56) References Cited

U.S. PATENT DOCUMENTS

| | | | |
|---|---|---|---|
| 4,881,023 A * | 11/1989 | Perusse et al. | 323/266 |
| 4,893,228 A * | 1/1990 | Orrick et al. | 363/98 |
| 5,216,351 A * | 6/1993 | Shimoda | 323/224 |
| 5,563,498 A * | 10/1996 | Candy | 323/224 |
| 5,592,072 A * | 1/1997 | Brown | 323/268 |
| 5,691,629 A * | 11/1997 | Belnap | 323/266 |
| 5,828,204 A * | 10/1998 | Jansen | 323/266 |
| 5,903,138 A * | 5/1999 | Hwang et al. | 323/266 |
| 6,031,362 A * | 2/2000 | Bradley | 323/269 |
| 6,441,591 B2 * | 8/2002 | Nokkonen | 323/266 |
| 6,509,721 B1 * | 1/2003 | Liebler | 323/224 |
| 6,664,773 B1 * | 12/2003 | Cunnac et al. | 323/277 |
| 6,864,668 B1 * | 3/2005 | McCune et al. | 323/266 |
| 6,933,772 B1 * | 8/2005 | Banerjee et al. | 327/541 |

(Continued)

FOREIGN PATENT DOCUMENTS

DE  P 30 06 707.3  10/1980

(Continued)

*Primary Examiner*—Karl Easthom
*Assistant Examiner*—Harry Behm
(74) *Attorney, Agent, or Firm*—J. Dennis Moore; W. James Brady, III; Frederick J. Telecky, Jr.

(57) ABSTRACT

A DC/DC converter has a linear voltage regulator for reducing or eliminating the output ripple of the converter with a minimum loss of efficiency. The converter comprises a converter stage with a supply voltage input, a converted voltage output and a control input, a regulator stage having an input connected to the converted voltage output of the converter stage and an output connected to a load, and a tracking circuit with inputs for a voltage at the converted voltage output of the converter stage, a voltage at the output of the regulator stage and a load sense current, and an output connected to the control input of the converter stage. The tracking circuit controls the converter stage so as to increase the converted voltage with an increasing load sense current and vice versa. The output voltage of the converter is always just sufficient to eliminate the ripple without having to operate the regulator's pass transistor in its linear range.

1 Claim, 2 Drawing Sheets

U.S. PATENT DOCUMENTS

| | | | |
|---|---|---|---|
| 7,026,800 B2 * | 4/2006 | Liu et al. | 323/270 |
| 2004/0076024 A1 * | 4/2004 | Liu et al. | 363/41 |
| 2005/0184712 A1 * | 8/2005 | Wei et al. | 323/282 |
| 2005/0184713 A1 * | 8/2005 | Xu et al. | 323/282 |

FOREIGN PATENT DOCUMENTS

| | | |
|---|---|---|
| EP | 01118684.8 | 3/2002 |
| GB | 9110548.6 | 11/1991 |
| WO | WO93/02407 | 2/1993 |

* cited by examiner

ACTIVE DROPOUT OPTIMIZATION FOR CURRENT MODE LDOS

The present invention relates to a DC/DC converter with a linear regulator for reducing the output ripple of the converter.

BACKGROUND OF THE INVENTION

The output voltage of a conventional DC/DC converter operating in a switched mode usually has a considerable ripple. This is especially the case for converters with hysteretic control. When such ripple cannot be tolerated for a particular application, a linear regulator is inserted between the output of the converter stage and the load to eliminate the ripple. Since the voltage regulator is not aware of the load requirements, the output voltage of the converter is adjusted to a level sufficient for the regulator to eliminate the ripple under all load conditions. As a consequence, the load current pass transistor in the voltage regulator usually operates in an unsaturated condition, resulting in a considerable loss of efficiency.

BRIEF SUMMARY OF THE INVENTION

The present invention provides a DC/DC converter with a linear regulator for reducing or eliminating the output ripple of the converter with a minimum loss of efficiency.

In a described embodiment, the converter comprises a converter stage, a regulator stage, and a tracking circuit. The converter stage has a supply voltage input, a converted voltage output and a control input. The regulator stage has an input connected to the converted voltage output of the converter stage and an output connected to a load. The tracking circuit has inputs for a voltage at the converted voltage output of the converter stage, a voltage at the output of the regulator stage and a load sense current, and an output connected to the control input of the converter stage. The tracking circuit controls the converter stage so as to increase the converted voltage with an increasing load sense current and vice versa. Accordingly, the output voltage of the converter is always just sufficient to eliminate the ripple without having to operate the regulator's pass transistor in its linear range.

In a detailed implementation, the linear regulator includes a load current pass transistor in MOS technology and the tracking circuit controls the converter stage such that the voltage at the converted voltage output of the converter stage is just sufficient to avoid operation of the load current pass transistor in an unsaturated state. As a power MOS transistor has virtually no voltage loss in its saturated state, a loss of efficiency is avoided.

BRIEF DESCRIPTION OF THE DRAWINGS

Further details of the invention will become apparent from the following description, with reference to the accompanying drawings, wherein.

DETAILED DESCRIPTION OF EMBODIMENTS

Figure 1:
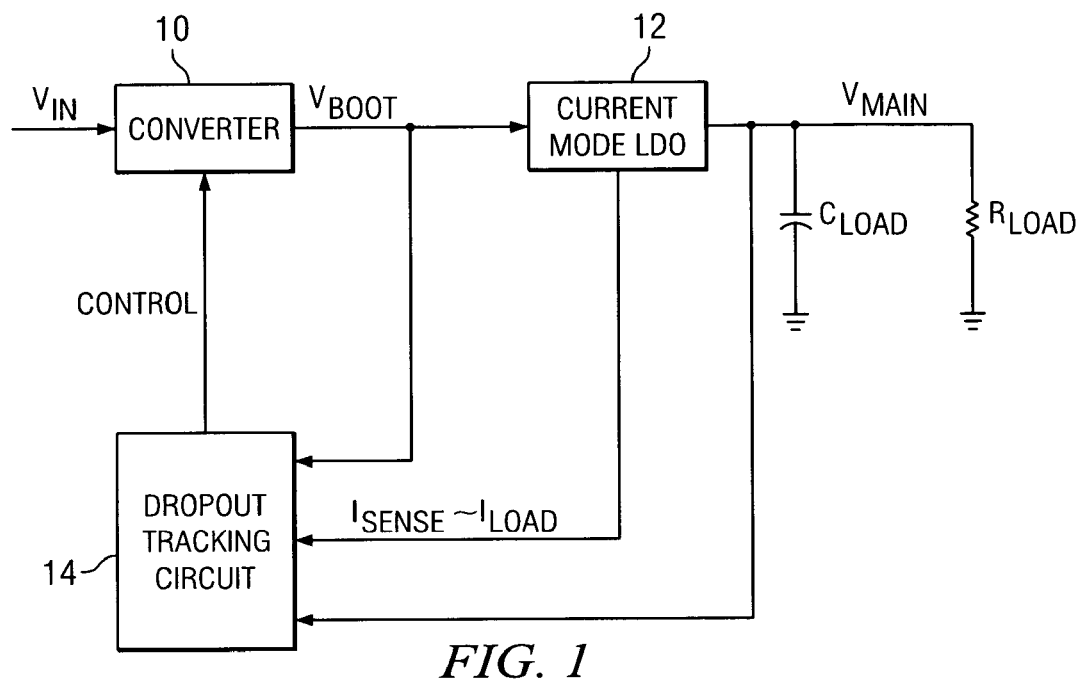
FIG. 1 is a block diagram of an embodiment of the inventive DC/DC converter.

The DC/DC converter in FIG. 1 comprises a converter stage 10, a current mode LDO (Low Dropout regulator or Linear Dropout regulator) 12 and a Dropout Tracking Circuit 14. An input voltage $V_{IN}$ of a system is converted (by means of a Buck-, Boost-Converter, Charge Pump, or other suitable means) to a certain output converter voltage at $V_{BOOT}$ (see FIG. 1). A current mode LDO converts the relative high ripple voltage at $V_{BOOT}$ to a low ripple voltage at $V_{MAIN}$. The dropout tracking circuit compares the voltages $V_{BOOT}$ with $V_{MAIN}$ and sends a Control Signal which is dependent on the load current $I_{LOAD}$ to the voltage converter (e.g., to change Duty Cycle of the Voltage Converter). The goal of this configuration is a low ripple output voltage $V_{MAIN}$ without high efficiency losses. To minimize the efficiency losses the dropout of the Linear Dropout Regulator is regulated via the dropout tracking circuit.

Figure 2:
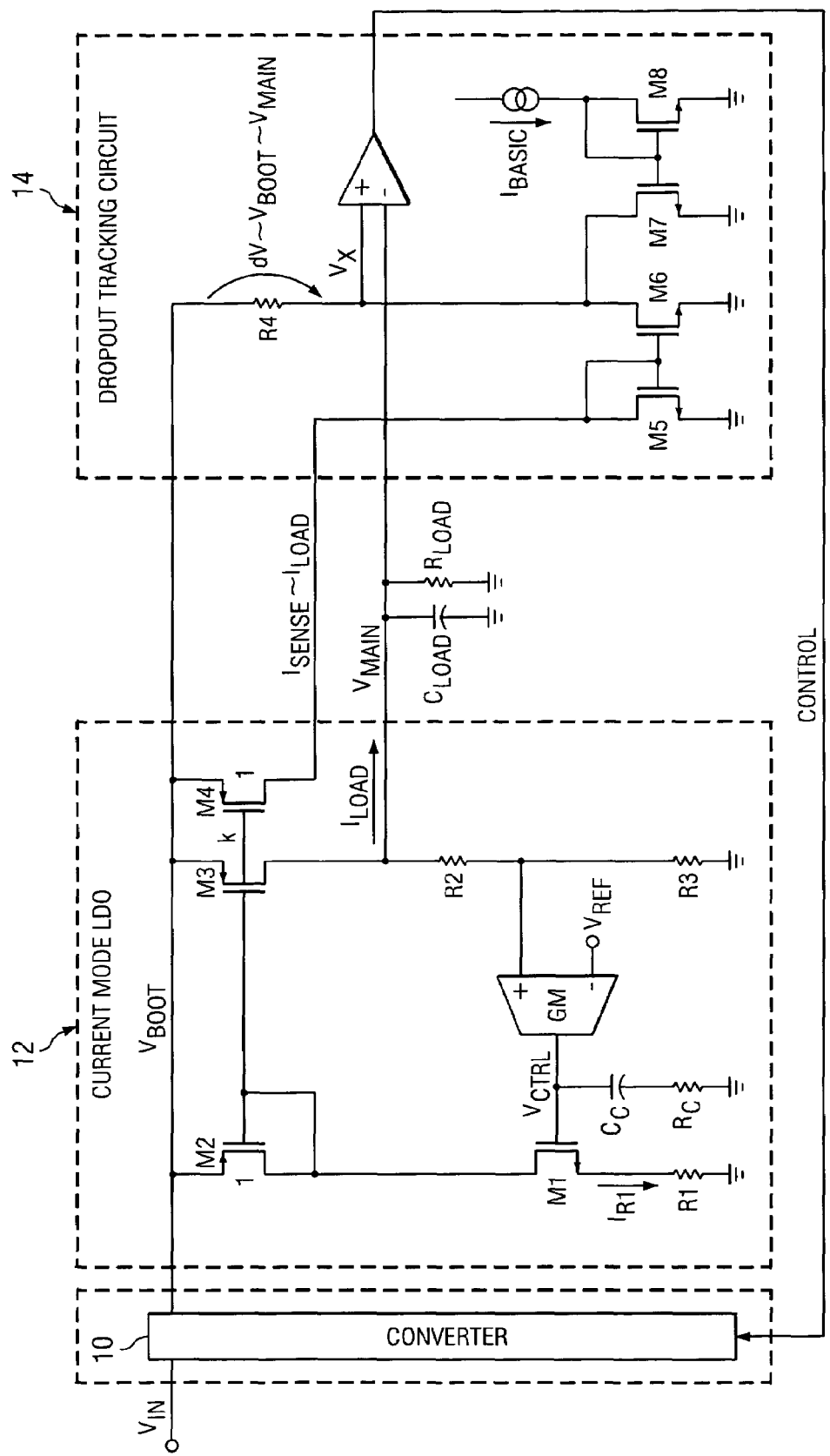
FIG. 2 is a circuit diagram of the converter.

FIG. 2 shows further details of a particular implementation. In the Current Mode LDO 12, the compensated ($C_c$, $R_e$) gm-stage compares the feedback voltage on the divider node between resistors R2 and R3 with a reference voltage $V_{REF}$. The output of the gm-stage controls the source follower transistor M1. This follower works as a voltage to current converter. The current through resistor R1 is mirrored via transistor M2 with a current amplification k to the pass transistor M3. Dependent on the output load of the LDO, the gate-source voltage of transistor M3 is controlled. The sense transistor M4 sends an $I_{LOAD}$ proportional current to the Dropout Tracking Circuit 14.

The Dropout Tracking Circuit 14 includes a hysteretic comparator, specifically, the hysteretic comparator compares the voltage $V_{MAIN}$ with voltage $V_x = V_{BOOT} - dV$. The offset voltage dV is proportional to the dropout of the LDO pass element transistor M3. Voltage $V_x$ depends on the load current. For higher load current, dV increases and the comparator sends a Control Signal to the converter to increase the voltage $V_{BOOT}$. This also means an increase in dropout voltage (VDS) of transistor M3.

The Converter 10 is controlled by an output of the Dropout Tracking Circuit 14. The $I_{LOAD}$ dependent control signal of the Dropout Tracking Circuit controls the converter output voltage $V_{BOOT}$, e.g., by changing the duty cycle. Depending on the type of "Dropout Tracking Circuit" (hysteretic with comparator or linear with OP-AMP), the converter could run as a hysteretic or linear regulated PWM converter (e.g. Buck- or Boost Converter). Advantages of the present invention are: With Current Mode LDO extremely low output voltage ripple (compared with a converter only); minimized LDO dropout to guarantee power supply rejection and optimized efficiency; possible for all Converter Topologies: Buck-, Boost-Converter, Charge Pumps; and the converter can be regulated in a PFM mode without sacrificing ripple performance.

The invention claimed is:

1. A DC/DC converter, comprising:
   a converter stage having (i) a converter input for connection to a supply voltage, (ii) a converter output for an output converted voltage, and (iii) a converter control input for adjusting the output converted voltage;
   a regulator stage for ripple control having (i) a regulator input connected to said converter output, (ii) a regulator output for connection to a load, (iii) a pass transistor connected between said regulator input and said regulator output, said pass transistor controlled by an error of a voltage at said regulator output from a reference voltage; and
   a tracking circuit having (i) a tracking input for a sense current which is proportional to a current through said pass transistor and (ii) a tracking output connected to said converter control input, wherein the tracking circuit controls the converter stage to increase the output converted voltage for an increased pass transistor current, and to decrease the output converted voltage for a decreased pass transistor current, wherein said tracking circuit includes a comparator with (i) an inverting input connected to said regulator output, (ii) a non-inverting input connected by a resistor to said converter output, and (iii) an output connected to said tracking circuit output, and wherein said sense circuit current is mirrored to said non-inverting input.

* * * * *